(12) United States Patent
Lee et al.

(10) Patent No.: US 8,588,104 B2
(45) Date of Patent: Nov. 19, 2013

(54) METHODS AND SYSTEMS OF REPORTING LOCATION INFORMATION THROUGH FAST-FEEDBACK CHANNELS IN WIMAX SYSTEM

(75) Inventors: Chun Woo Lee, San Ramon, CA (US); Jong Ro Park, San Ramon, CA (US)

(73) Assignee: QUALCOMM Incorporated, San Diego, CA (US)

(*) Notice: Subject to any disclaimer, the term of this patent is extended or adjusted under 35 U.S.C. 154(b) by 413 days.

(21) Appl. No.: 12/688,765

(22) Filed: Jan. 15, 2010

(65) Prior Publication Data

US 2010/0195536 A1 Aug. 5, 2010

Related U.S. Application Data

(60) Provisional application No. 61/148,939, filed on Jan. 31, 2009.

(51) Int. Cl.
*H04L 12/28* (2006.01)
(52) U.S. Cl.
USPC .......................................................... 370/254
(58) Field of Classification Search
USPC .......................................................... 370/254
See application file for complete search history.

(56) References Cited

U.S. PATENT DOCUMENTS

| 7,630,391 B2* | 12/2009 | Jin et al. ..................... 370/431 |
| 2006/0025154 A1* | 2/2006 | Alapuranen et al. ....... 455/456.1 |
| 2006/0111129 A1* | 5/2006 | Ihm et al. ..................... 455/466 |
| 2006/0111149 A1* | 5/2006 | Chitrapu et al. ........... 455/562.1 |
| 2007/0042790 A1* | 2/2007 | Mohi et al. ................ 455/456.5 |
| 2007/0218926 A1 | 9/2007 | Zhuang et al. |
| 2009/0034526 A1 | 2/2009 | Ahmadi et al. |
| 2009/0060010 A1 | 3/2009 | Maheshwari et al. |
| 2009/0303928 A1* | 12/2009 | Chun et al. ................... 370/328 |

FOREIGN PATENT DOCUMENTS

| GB | 2448743 | 10/2008 |
| WO | WO2005/062067 | 7/2005 |
| WO | WO2009/009863 | 1/2009 |

OTHER PUBLICATIONS

Woongsup Lee et al., "CQI Feedback Reduction based on Spatial Correlation in OFDMA System", Vehicular Technology Conference, 2008. VTC 2008-Fall. IEEE 68th, 2008, pp. 1-5.
Young-June Choi et al., "Partial Channel Feedback Schemes Maximizing Overall Efficiency in Wireless Networks", IEEE Transactions on Wireless Communications, Apr. 2008, pp. 1306-1314, vol. 7, No. 4.
International Search Report & Written Opinion—PCT/US2010/022670—International Search Authroity—European Patent Office—May 20, 2010.
IEEE P802.16Rev2/D6, "Draft Standard for Local and metropolitan area networks Part 16:Air Interface for Broadband Wireless Access Systems" Jul. 2008.
Taiwan Search Report—TW099102637—TIPO —Feb. 25, 2013.

* cited by examiner

*Primary Examiner* — Mark Rinehart
*Assistant Examiner* — Christopher R Crompton
(74) *Attorney, Agent, or Firm* — Tyler J. Overall

(57) ABSTRACT

Certain embodiments of the present disclosure may allow for transmitting location information from a mobile station to a base station. The mobile station can determine differential location information (DLI) of the mobile station relative to an absolute location of the mobile station and transmit the DLI to the base station. The base station can receive DLI from the mobile station, the DLI indicating a location of the mobile station relative to an absolute location, and adjust parameters of the mobile station based, at least in part, on the DLI.

30 Claims, 13 Drawing Sheets

| Syntax | Size (bit) | Notes |
|---|---|---|
| FastFeedback_Alloc_IE() { | - | |
| OFDMA symbol offset | 8 | The offset of the OFDMA symbol in which the region starts |
| Subchannel offset | 7 | The offset of the subchannel in which the region starts. |
| No. OFDMA symbols | 7 | Number of OFDMA symbols of the region |
| No. Subchannels | 7 | Number of subchannels of the region |
| reserved | 3 | Padding bits to make this IE nibble-aligned |
| } | - | |

Fast-Feedback Allocation IE

FIG. 4

An example of 6-bit DLI data format

An example of 12-bit DLI format

| DLI Profile ID | DLI format | | | | |
|---|---|---|---|---|---|
| | Size (bit) | Coordinate System | Resolution (angle:distance) | Unit of angle | Unit of distance |
| 0 | 6 | Polar | 3:3 | 45 degree | 10 meter |
| 1 | 6 | Polar | 3:3 | 45 degree | 20 meter |
| 3 | 12 | Polar | 6:6 | 5.625 degree | 10 meter |
| 4 | 12 | Cartesian | 6:6 | n/a | 10 meter |

DLI profile table example

FIG. 7

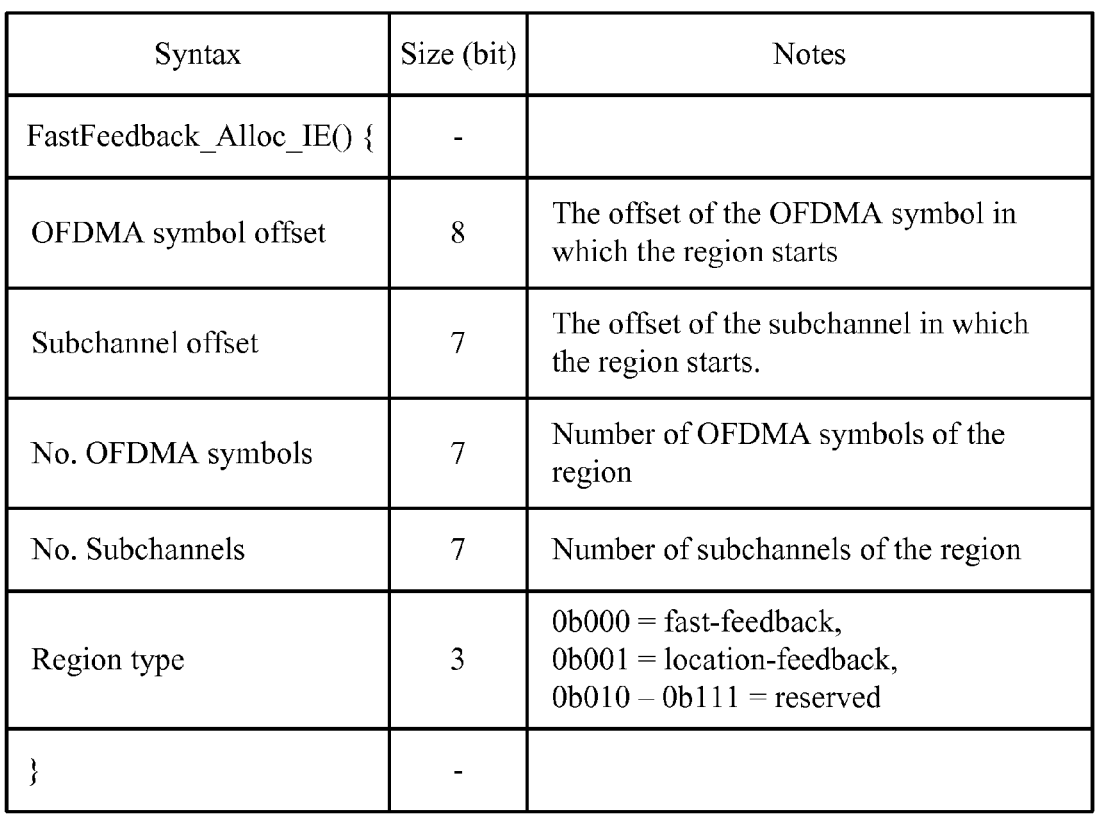

| Syntax | Size (bit) | Notes |
|---|---|---|
| FastFeedback_Alloc_IE() { | - | |
| OFDMA symbol offset | 8 | The offset of the OFDMA symbol in which the region starts |
| Subchannel offset | 7 | The offset of the subchannel in which the region starts. |
| No. OFDMA symbols | 7 | Number of OFDMA symbols of the region |
| No. Subchannels | 7 | Number of subchannels of the region |
| Region type | 3 | 0b000 = fast-feedback,<br>0b001 = location-feedback,<br>0b010 – 0b111 = reserved |
| } | - | |

Modified Fast-Feedback Allocation IE

FIG. 8

METHODS AND SYSTEMS OF REPORTING LOCATION INFORMATION THROUGH FAST-FEEDBACK CHANNELS IN WIMAX SYSTEM

CLAIM OF PRIORITY

This application claims the benefit of priority from U.S. Provisional Patent Application Ser. No. 61/148,939, entitled "Methods and Systems of Reporting Location Information through Fast-Feedback Channels in WiMAX System" and filed Jan. 31, 2009, which is assigned to the assignee of this application and is fully incorporated herein by reference for all purposes.

TECHNICAL FIELD

Certain embodiments of the present disclosure generally relate to wireless communication, and more particularly, to an effective method for exchanging location information between a mobile station and a base station.

BACKGROUND

Location-based services (LBSs) generally refer to information services accessible with mobile devices through a mobile network, such as those defined by the Worldwide Interoperability for Microwave Access (WiMAX) standard (IEEE 802.16). An LBS utilizes the ability to make use of the geographical position of the mobile devices. LBS services include services to identify a location of a person or object, such as discovering the nearest banking cash machine or the whereabouts of a friend or employee. LBS services can also include parcel tracking and vehicle tracking services. Furthermore, LBS can also include personalized weather services and even location-based games.

Due to the popularity and potential of LBSs, demand and usage of location information of a mobile device have been increasing sharply.

SUMMARY

Certain embodiments provide a method for wireless communications. The method generally includes determining differential location information (DLI) of a mobile station relative to an absolute location of the mobile station and transmitting the differential location to a base station.

Certain embodiments provide an apparatus for wireless communications. The apparatus generally includes logic for determining differential location information (DLI) of a mobile station relative to an absolute location of the mobile station and logic for transmitting the differential location to a base station.

Certain embodiments provide an apparatus for wireless communications. The apparatus generally includes means for determining differential location information (DLI) of a mobile station relative to an absolute location of the mobile station and means for transmitting the differential location to a base station.

Certain embodiments provide a computer-program product for wireless communication, comprising a computer readable medium having instructions stored thereon, the instructions being executable by one or more processors. The instructions generally include instructions for determining differential location information (DLI) of a mobile station relative to an absolute location of the mobile station and instructions for transmitting the differential location to a base station.

Certain embodiments provide a method for wireless communications. The method generally includes receiving differential location information from a mobile station, the differential location information indicating a location of the mobile station relative to an absolute location adjusting parameters of the mobile station based, at least in part, on the differential location.

Certain embodiments provide an apparatus for wireless communications. The apparatus generally includes logic for receiving differential location information from a mobile station, the differential location information indicating a location of the mobile station relative to an absolute location and logic for adjusting parameters of the mobile station based, at least in part, on the differential location.

Certain embodiments provide an apparatus for wireless communications. The apparatus generally includes means for receiving differential location information from a mobile station, the differential location information indicating a location of the mobile station relative to an absolute location and means for adjusting parameters of the mobile station based, at least in part, on the differential location.

Certain embodiments provide a computer-program product for wireless communication, comprising a computer readable medium having instructions stored thereon, the instructions being executable by one or more processors. The instructions generally include instructions for receiving differential location information from a mobile station, the differential location information indicating a location of the mobile station relative to an absolute location and instructions for adjusting parameters of the mobile station based, at least in part, on the differential location.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 4 illustrates a table defining a Fast-Feedback Allocation IE.

FIG. 7 shows an example of different DLI formats that may be supported in accordance with certain embodiments set forth herein.

FIG. 8 illustrates a table defining the modified Fast-Feedback Allocation IE format in accordance with certain embodiments set forth herein.

DETAILED DESCRIPTION

Figure 1:
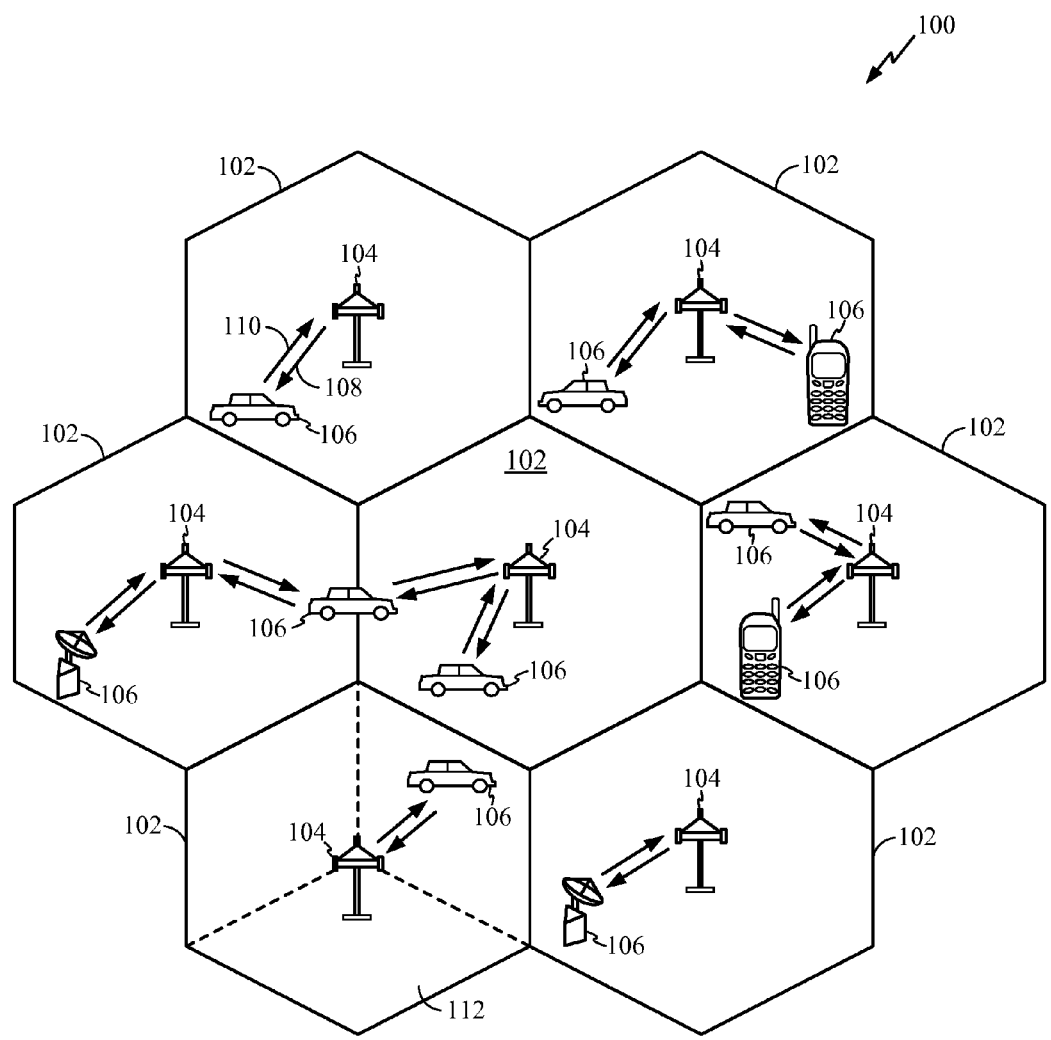
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Demand and usage of location information of a mobile terminal device have been increasing sharply. Most of today's cellular phones have a global-positioning system (GPS) on it. In most cases, location information is used for applications such as navigation systems, child chaperone systems or emergency tracking systems. However, the location information also can be used in a Media Access Control (MAC) layer to enhance radio link stability, choose optimal modulation and coding, decide a MIMO mode, a multiplexing scheme or a multiple access scheme, and prepare hand-over early and precisely.

In order for a base station (BS) to use a mobile station's (MSs) location information in a MAC layer, the BS needs to get up-to-date MS location information frequently. In cases where the MS reports its location to a BS in a fairly short period, the location data will occupy significant amount of resources because of the large size of the location information.

Exemplary Wireless Communications System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
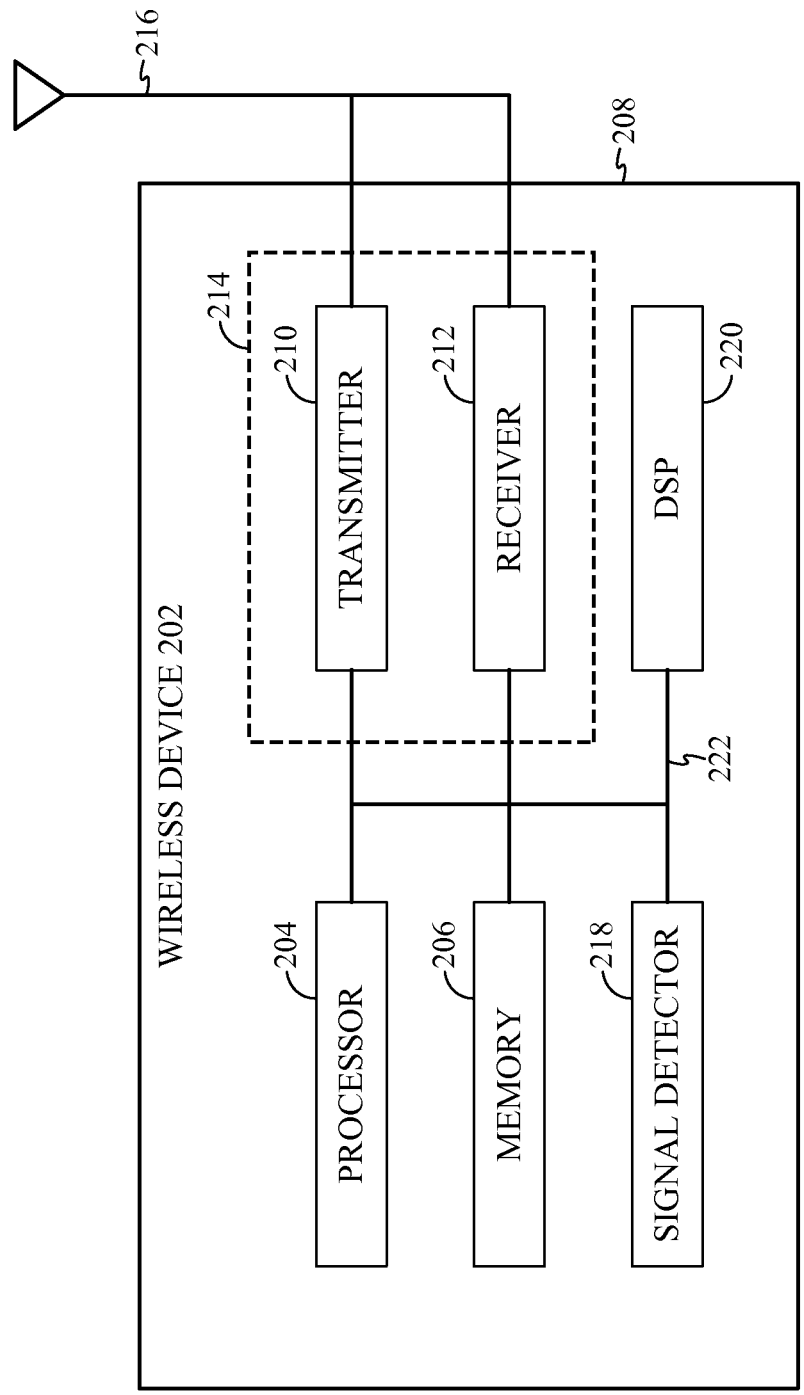
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
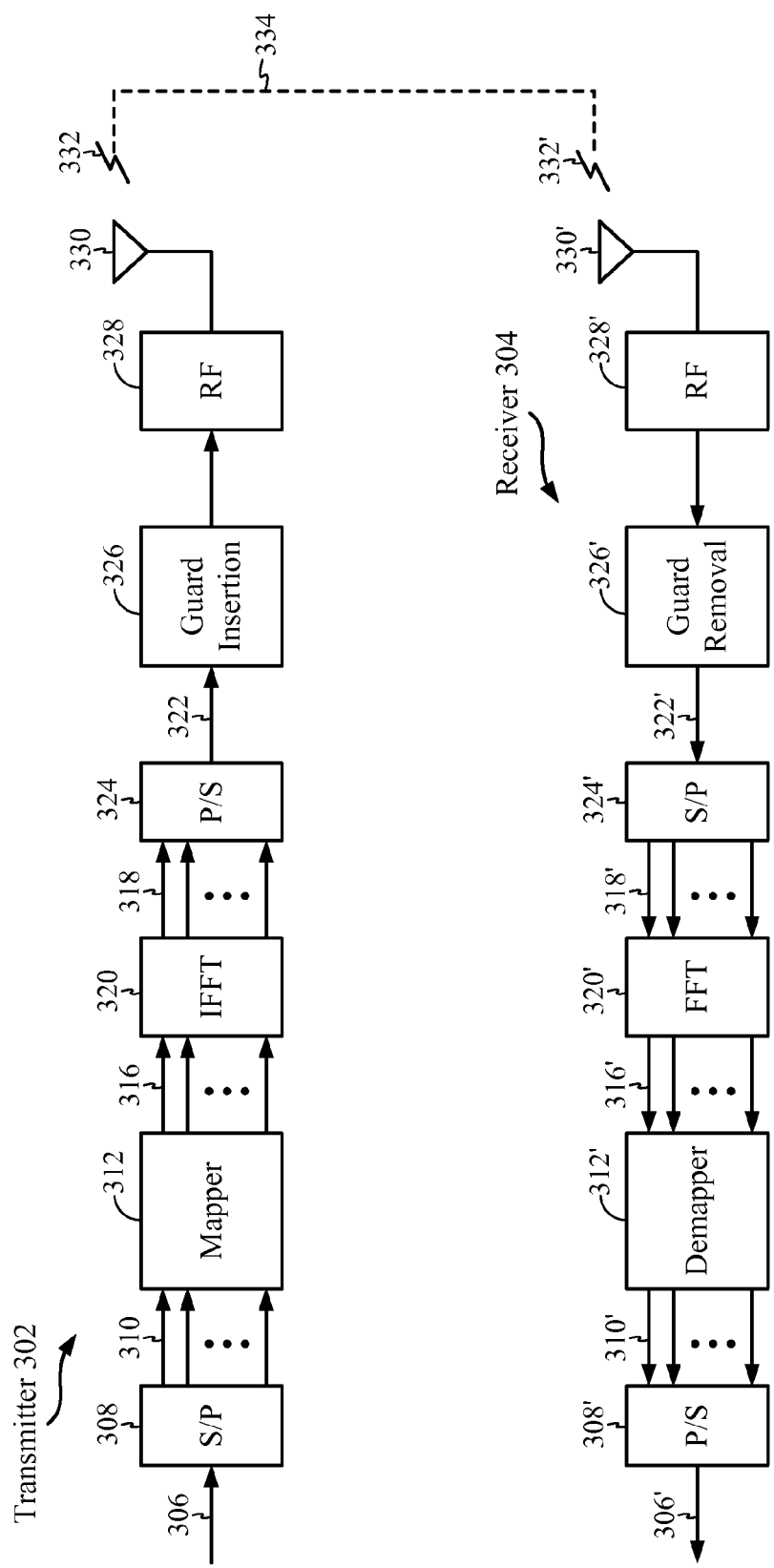
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Reporting Location Information through Fast-Feedback Channels

Certain embodiments of the present disclosure may help reduce overhead associated with reporting location information of an MS to a BS. The overhead may be reduced by transmitting only information indicating a change in location. The change in location, referred to as Differential Location Information (DLI), may be relative to previously transmitted Absolute Location information (ALI).

For certain embodiments, the DLI may be transmitted using a feedback channel, such as a channel quality indicator (CQI) channel. For certain embodiments, a channel reserved specifically for DLI may be used (e.g., a dedicated DLI channel).

Because the DLI is relative to ALI, a relatively small number of bits may be used to convey the DLI. As a result, transmitting full ALI only occasionally, followed by more frequent DLI transmissions may result in efficient MS location reporting. On the BS side, the BS may utilize this location information to adjust transmission parameters in an effort to optimize network performance.

As noted above, the MS may report DLI to a BS in the CQI channel. In a WiMAX system, the CQI channel is conventionally used to report downlink channel quality. The CQI channel is typically allocated by the BS in a Fast-Feedback region in an uplink for the MSs to report downlink channel quality. The BS may use this channel information to adjust transmission parameters (e.g., to select an optimal modulation type and/or to decide when to hand-over the MS to a neighbor BS).

A Fast-Feedback region consists of multiple fast-feedback slots (i.e., CQI channels, or CQICHs), each of which may be assigned to a specific MS through over-the-air (OTA) messages. Such messages include a CQICH Allocation Information Element (IE) in an uplink map message (UL-MAP), a Fast-Feedback Subheader (FFSH), a CQICH Enhanced Allocation IE, and the like.

FIG. 4 illustrates a table 400 defining an example Fast-Feedback Allocation IE as defined in the IEEE 802.16 standard for WiMAX in accordance with certain embodiments set forth herein. As shown, the example Fast-Feedback Allocation IE is a 32-bit information element (IE), where 8 bits are reserved for an OFDMA symbol offset, 7 bits are reserved for a subchannel offset, 7 bits are reserved for the number of OFDMA symbols of the region, 7 bits are reserved for the number of subchannels of the region, and 3 bits are reserved.

Because the Fast-Feedback region is typically allocated in a broadcast manner and each CQI channel may be allocated in persistent manner, meaning the channel is allocated until affirmatively de-allocated and subsequent allocations are not necessary, using a CQI channel for DLI may be very efficient. In addition, CQI data may be very strongly coded with the most robust modulation. Therefore, the probability of data loss may be reasonably low in most cases. According to some IEEE 802.16 standards, one CQI channel can carry 6 bits maximum. There is no MAC header and no CRC, which are normally 6 bytes and 4 bytes respectively.

Certain IEEE 802.16 standards do not use MS location information and, therefore, there is no MAC layer message defined to exchange location information. However, as described herein, MS location information may be very useful for a BS to decide scheduling regarding the MS. For example, if a BS-A determines that a MS is moving towards BS-B at a particular speed S, BS-A can initiate the MS-A's hand-over preparation in advance to minimize data delay or loss during the hand-over.

Figure 5:
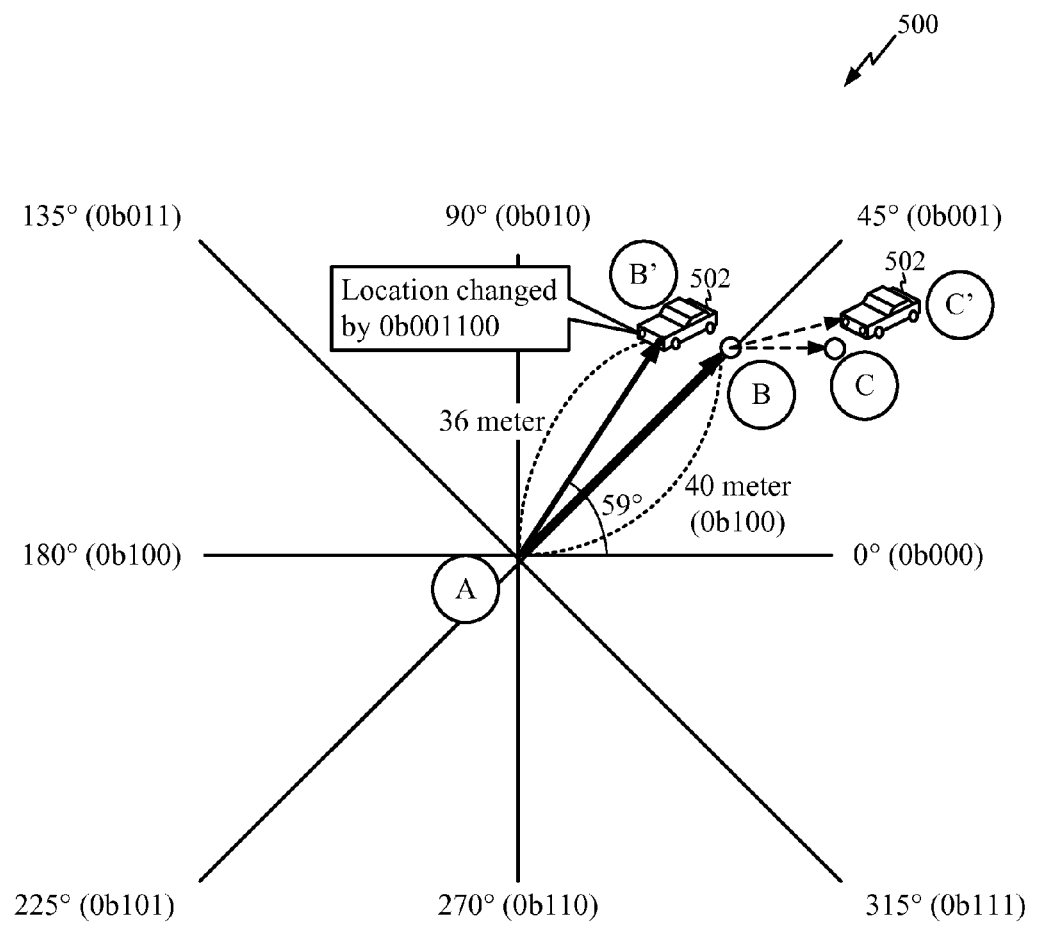
FIG. 5 illustrates the use of an example 6-bit DLI data format using a Polar coordinate system in accordance with certain embodiments set forth herein.

FIG. 5 illustrates the use of an example 6-bit DLI data format using a Polar coordinate system in accordance with certain embodiments set forth herein. As shown, if an object 502 moves from point A to point B', the location of B' may be represented by direction (angle) and distance relative to the location A.

In the example 6-bit representation of the DLI, the most significant 3-bits can be used for the direction and the least significant 3-bits can be used for distance. As shown, the most significant 3-bits can express eight different angles (i.e., 0°, 45°, 90°, 135°, 180°, 225°, 270° and 315° and the least significant 3-bits can express the distance in unit of 10-meters. Thus, if the object 502 moves 36 meters in a direction of 59 degrees North-East, the values are rounded off to the nearest unit, 40 meters and 45 degree respectively, then converted into 3-bit values. As shown, the 6-bit value representing the DLI is 0b001110. Of course, the least significant 3-bits can be used for the distance and the most significant 3-bits can be used to express angle, and any unit, e.g., 20-meters, can be used for the distance.

If the object 502 moves further (from point B') to point C', the C' location may be represented from the point B (which is the current location the BS will have calculated), rather than B' which was the actual location of the object. In doing so, errors can be prevented from accumulating.

As illustrated in FIG. 5, because DLI information consumes only 6-bits, it may be transmitted in a single CQICH. For certain embodiments, the BS may assign more than one CQI channel for the DLI. For example, if a BS assigns two CQI channels, a 12-bit DLI format may be used.

Figure 6:
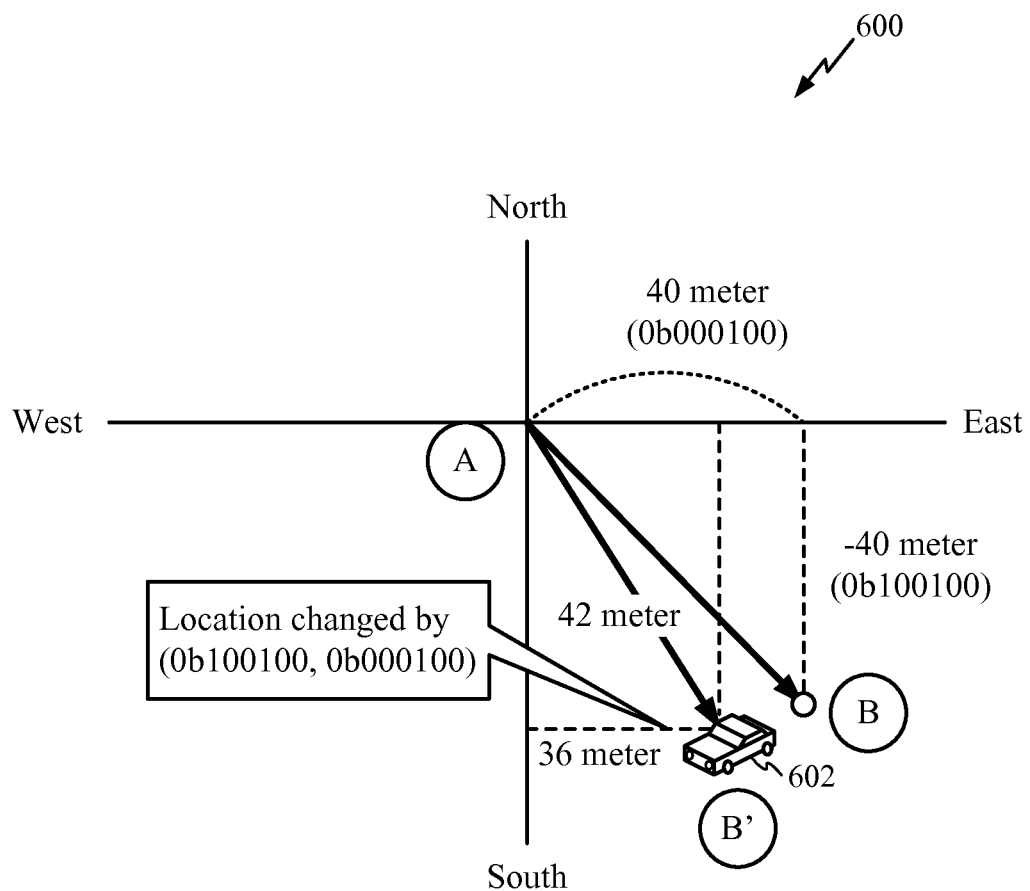
FIG. 6 shows an example of a 12-bit DLI format using a Cartesian coordinate system in accordance with certain embodiments set forth herein.

FIG. 6 shows an example 600 of a 12-bit DLI format using a Cartesian coordinate system in accordance with certain embodiments set forth herein. In this case, 6-bits may be used for horizontal distance and the other 6-bits may be used for vertical distance. The most significant bit of each may be used to distinguish a positive or negative value.

As in illustrative example, if an object 602 moves from A to B', the location of B' can be represented by a horizontal and vertical distance relative to the location A. As shown, if the object 602 moves 42 meters South, and 36 meters East from location A, the values are rounded off to the nearest unit, −40 meters and 40 meters respectively, and subsequently converted into two 6-bit values. As shown, the 6-bit value representing the horizontal DLI is 0'b000100 and the 6'bit representing the vertical DLI is 0b100100.

While FIG. 6 illustrates a Cartesian coordinate system, according to certain embodiments, a polar coordinate system may be used for 12-bit DLI of course. In any case, MSs and BSs may support multiple different DLI types. If multiple DLI are used, a BS and a MS need to communicate with each other to configure a common DLI format. For certain embodiments, a DLI profile ID may be used to configure a common format.

In order to reduce (and possibly minimize) the size of the message used to transmit the DLI profile ID, the size of the DLI profile ID may vary depending on how many different DLI types are supported. For example, if only two DLI types are supported, the DLI profile ID may be expressed by 1 bit. As another example, if 16 DLI types are supported, 4 bits may be used to represent the DLI profile ID.

For certain embodiments, the DLI profile ID may be transmitted in a CQICH Allocation IE. In this case, the BS may change the DLI type dynamically during operation. In this way, the BS may choose a more accurate DLI type when there is enough UL bandwidth available.

FIG. 7 shows an example 700 of different DLI formats that may be supported in accordance with certain embodiments set forth herein. As shown, a DLI format may vary by size (6-bit, 12-bit, etc), coordinate system (Polar, Cartesian, etc.), Resolution (angle:distance), Unit of Angle, and Unit of Distance.

As stated above, for certain embodiments, an MS may use an existing CQI channel to report DLI. For certain embodiments, the MS may use a dedicated Location-Feedback region that is dedicated for DLI. The Location-Feedback region may be allocated by modifying the existing Fast-Feedback Allocation IE illustrated in FIG. 4. As noted earlier, the Fast-Feedback Allocation IE illustrated in FIG. 4 contains a 3-bit reserved region. This reserved region may be used to distinguish the type of region (i.e., fast-feedback region, location-feedback region) to be allocated.

FIG. 8 illustrates a table 800 defining the modified Fast-Feedback Allocation IE format in accordance with certain embodiments set forth herein. As shown, the example 3-bit reserved region is defined as a 3-bit region type field. By defining an independent region from the Fast-Feedback region, various sizes of a DLICH channel may now be defined (as opposed to the limited/fixed 6-bit size of the CQICH). Thus, the new DLICH may be designed in a way that is optimal for a DLI format.

When allocating DLI channels inside a Location-Feedback region, a new UL-MAP IE may be defined, for example, a DLI Allocation IE. The DLI Allocation IE may include a DLICH_ID, a DLI channel allocation offset, a reporting period, a reporting frame offset, a reporting duration and a DLI profile/DLI type.

Figure 9:
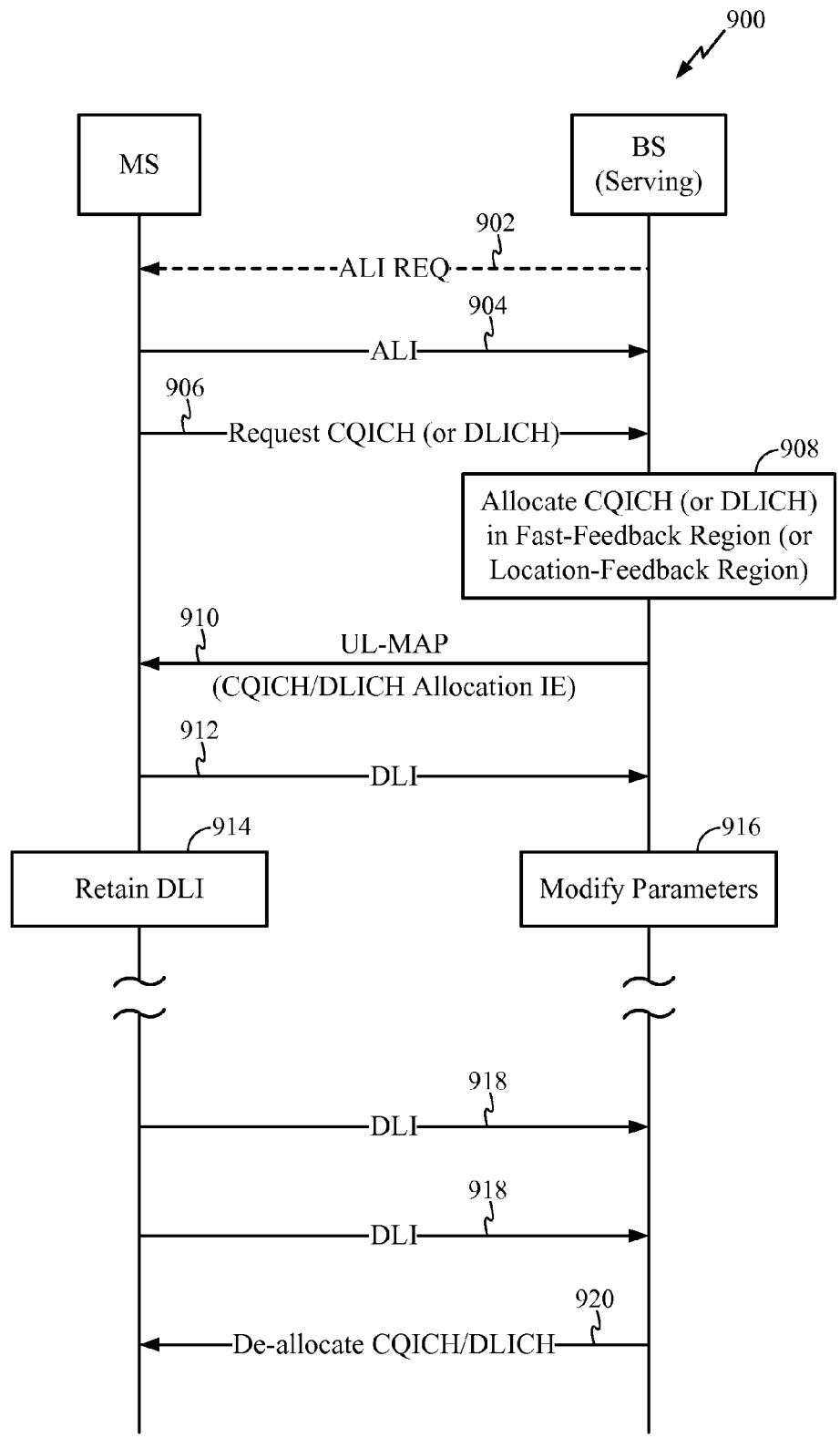
FIG. 9 illustrates an example message exchange for reporting location information in accordance with certain embodiments set forth herein.

FIG. 9 illustrates an example message exchange 900 for reporting location information in accordance with certain embodiments set forth herein. As shown for certain embodiments, a BS may request absolute location information (ALI) of the MS by sending a request message 902 to the MS. The request message may be defined as a Type/Length/Value (e.g., ALI Request TLV) supported by WiMAX. In this case, the ALI Request TLV may be embedded in an existing MAC management message such as a Report Request (REP-REQ), a Mobile Scanning Request (MOB_SCN-REQ), or the like. For certain embodiments, the MS may report its ALI in an unsolicited manner instead of as a response to a BS request.

Regardless, the ALI 904 may be transmitted as a new TLV (e.g., ALI TLV) supported by WiMAX. In this case, the ALI TLV may be embedded in an existing MAC management message such as a Ranging Request (RNG-REQ), a Report Response (REP-RSP), a Mobile Scanning Response (MOB_SCN-RSP), or the like.

The MS may also send a request message 906 to the BS to assign a CQI channel (or a DLI channel as discussed above) to report the DLI. For certain embodiments, the MS may send the request message when the MS moves out of a certain distance and/or at a certain speed from the serving BS. The MS is assumed to know the BS's location. For example, the BS may broadcast its location using an OTA message. Alternatively, the MS may have a pre-installed BS location table.

After receiving the request from the MS, the BS can start allocation 908 of a CQI channel (or channels, as discussed above). The BS may also start allocation when the MS is in a certain condition. Such conditions may include when the reported distance of the MS from the BS is bigger than a threshold or the reported downlink (DL) or measured uplink (UL) channel quality is worse than a threshold.

After the CQI channel is allocated, the BS may inform the MS of the CQICH (or DLICH) allocated for the MS. For certain embodiments, the BS may transmit a UL_MAP 910 to the MS, which contains a CQICH allocation IE specifying the CQICH.

In another embodiment, if a DLICH is being allocated, the UL_MAP may contain a DLICH allocation IE specifying the DLICH. In any case, the Allocation IE may also specify the DLI data format used, as discussed above.

Once the CQICH (or DLICH) is allocated, the MS may send the DLI 912 to the BS using the CQICH (or DLICH). After sending the DLI, the MS retains the DLI 914 and uses it as the next reference point. For example, as illustrated in FIG. 5, when the object 502 is in location B', the DLI indicates the object 502 as being at location B (i.e., location B is the DLI). Location B is then saved and used as the next reference point, for example, when calculating the differential location of object 502 at location C'.

Once the BS receives the DLI, the BS may process the information to update a current location of the MS and, in response, may modify parameters 916 of the MS based on the DLI. For example, the BS may change the modulation and coding technique as the distance between the MS and BS changes. As another example, if the DLI indicates that the distance of the MS from the BS is bigger than a threshold, the BS may make preparations to perform a handoff to a BS closer to the MS.

As shown, the MS may continue to report DLI 918 on an allocated CQI (or DLI) channel until the allocated CQI (or DLI) channel is de-allocated 920 by the BS. In an effort to ensure accurate location information, the BS may periodically request ALI from the MS and/or the MS may periodically send ALI in an unsolicited manner.

Figure 10:
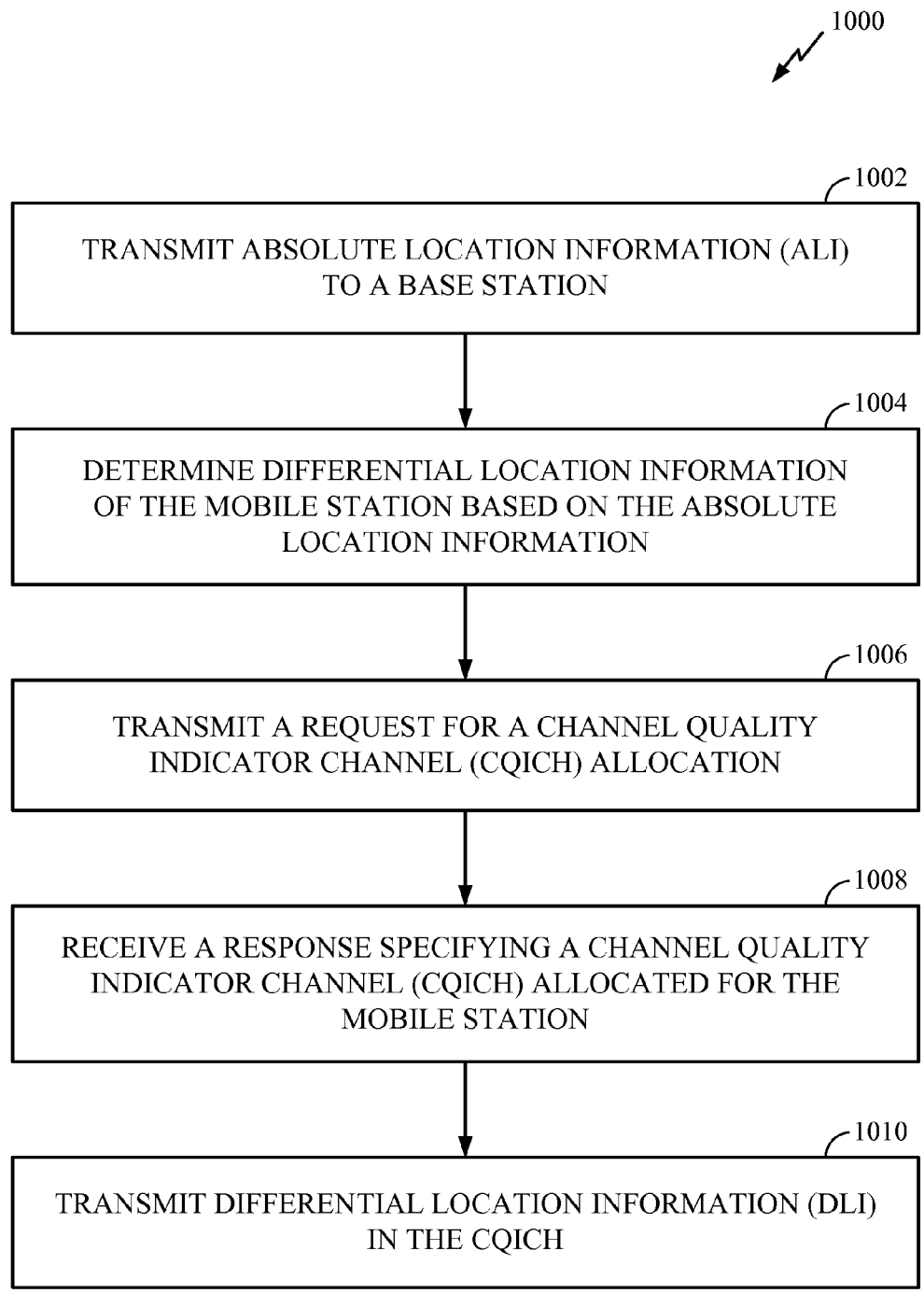
FIG. 10 illustrates example operations for exchanging location information between a base station and a mobile station in accordance with certain embodiments set forth herein.

FIG. 10 illustrates example operations 1000 for exchanging location information between a base station and a mobile station in accordance with certain embodiments set forth herein.

At 1002, an MS may transmit absolute location information (ALI) to a BS. As noted above, the ALI may be transmitted in response to a request by the BS or in an unsolicited manner. At 1004, the MS may determine a differential location of the MS based on the ALI. At 1006, the MS may then transmit a request message to allocate a channel quality indicator channel (CQICH) for the MS to transfer the differential location information (DLI). Alternatively, the MS may request to allocate a DLI channel (DLICH). Once allocated, at step 1008, the MS may receive a response message specifying a CQICH (or DLICH) allocated for the MS. Using the CQICH (or DLICH), the MS may transmit the DLI to the BS at step 1010.

Figure 11:
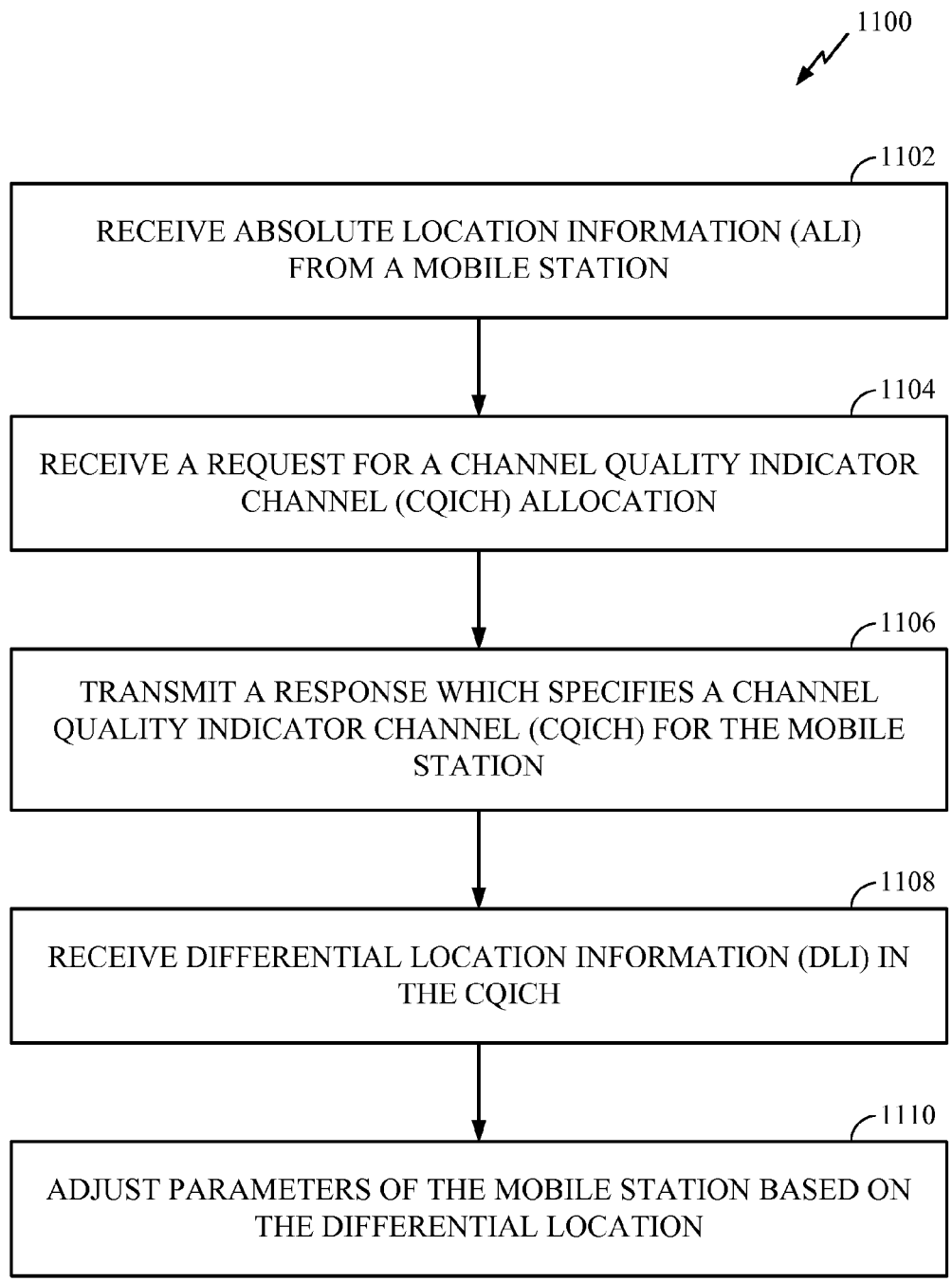
FIG. 11 illustrates example operations for exchanging location information between a base station and a mobile station in accordance with certain embodiments set forth herein.

FIG. 11 illustrates example operations 1100 for exchanging location information between a base station and a mobile station in accordance with certain embodiments set forth herein. At 1102, the BS may receive ALI from an MS, received in response to a request by the BS or received in an unsolicited manner. In either case, at 1104, the BS may receive a request message to allocate a CQICH. Alternatively, the BS may receive a request message to allocate a DLICH. At 1106, the BS may transmit a response message specifying the CQICH (or DLICH) allocated for the MS. At 1108, the BS may receive DLI regarding the MS on the allocated CQICH (or DLICH). At 1100, the BS may adjust parameters of the MS based on the received DLI.

Figure 10A:
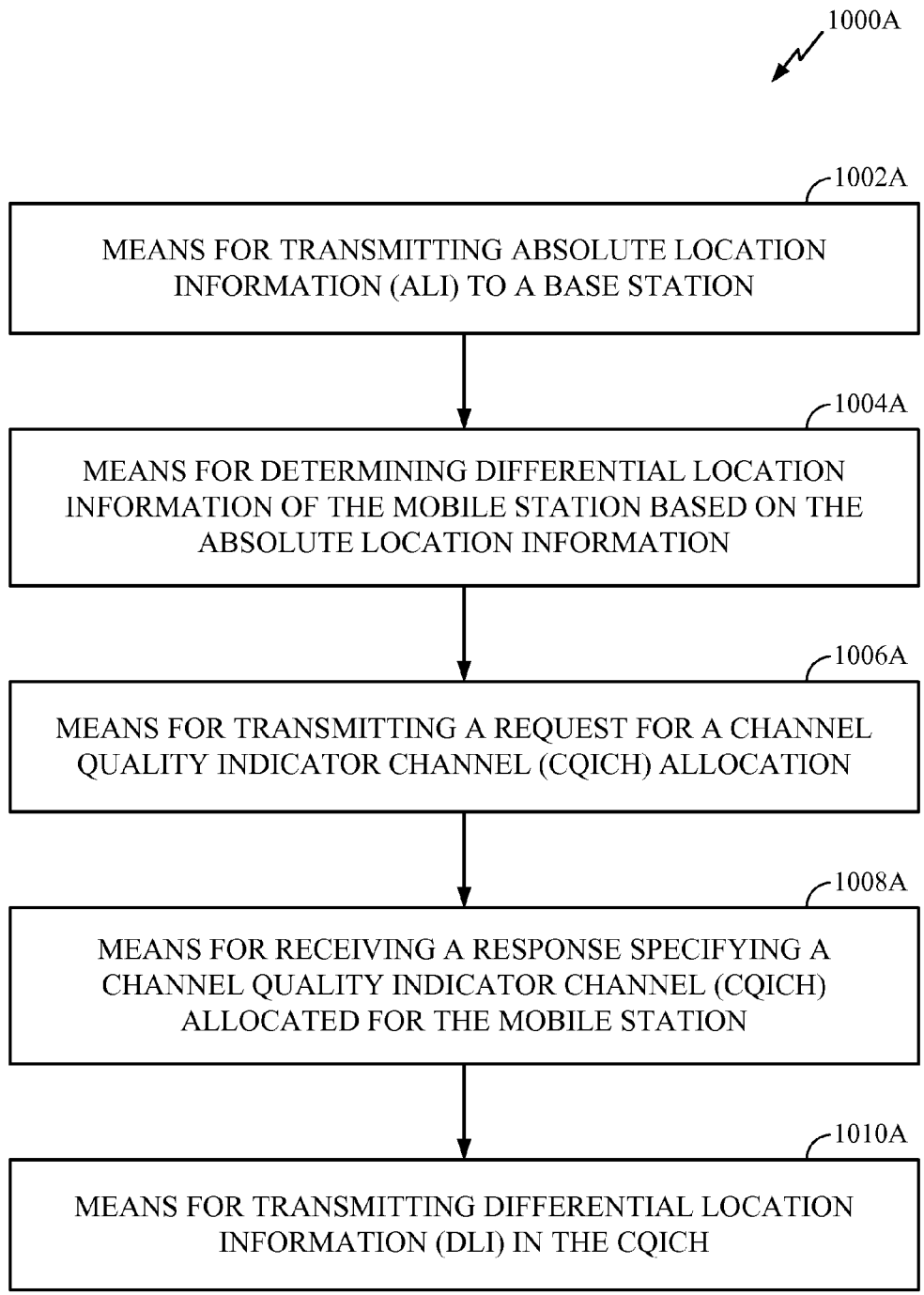
FIG. 10A illustrates example components capable of performing the operations of FIG. 10.
Figure 11A:
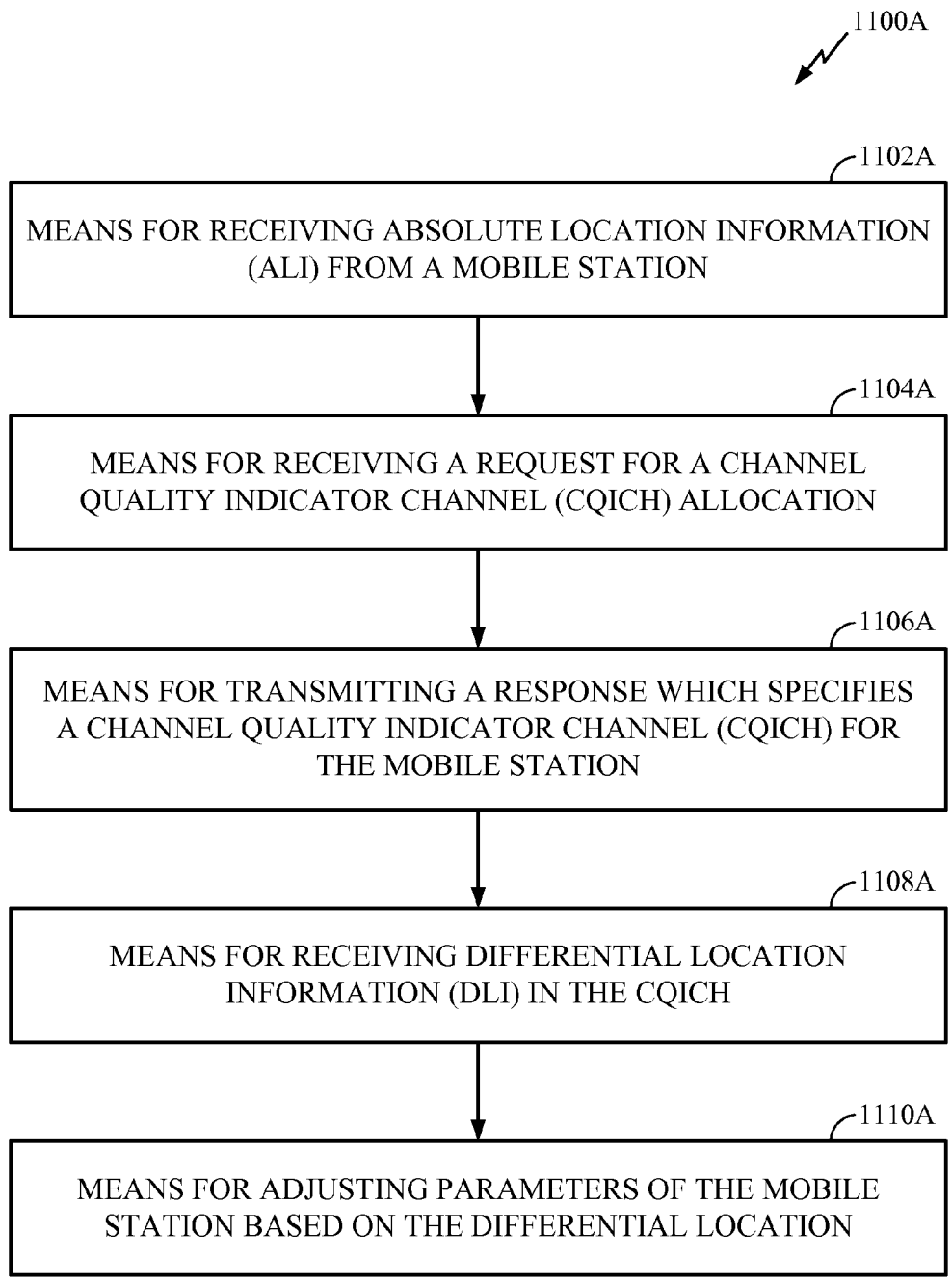
FIG. 11A illustrates example components capable of performing the operations of FIG. 11.

The various operations of methods described above may be performed by various hardware and/or software component(s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, operations 1000 illustrated in FIG. 10 corresponds to means-plus-function blocks 1000A illustrated in FIG. 10A, and operations 1100 illustrated in FIG. 11 corresponds to means-plus-function blocks 1100A illustrated in FIG. 11A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
receiving from a base station, in an allocation for a fast-feedback region channel quality indicator channel, a differential location information (DLI) profile identifier specifying transmission of a Polar coordinate system representation of DLI;
determining, based in part on the DLI profile identifier, the Polar coordinate system representation of DLI for the mobile station relative to an absolute location of the mobile station; and
transmitting the Polar coordinate system representation of the DLI to a base station in the fast-feedback region channel quality indicator channel allocated for the mobile station.

2. The method of claim 1, further comprising:
transmitting information regarding the absolute location to the base station.

3. The method of claim 2, wherein the information regarding the absolute location is transmitted in a response to a request for the absolute location by the base station.

4. The method of claim 1, wherein a portion of the Polar coordinate system representation of DLI comprises a plurality of bits indicating one of a plurality of different angles, and another portion of the Polar coordinate system representation of DLI comprises another plurality of bits indicating a number of units of distance.

5. An apparatus for wireless communications, comprising:
a processor;
memory in electronic communication with the processor; and
instructions stored in the memory and executable by the processor to:
receive from a base station, in an allocation for a fast-feedback region channel quality indicator channel, a differential location information (DLI) profile identifier specifying transmission of a Polar coordinate system representation of DLI;
determine, based in part on the DLI profile identifier, the Polar coordinate system representation of DLI for the mobile station relative to an absolute location of the mobile station; and
transmit the Polar coordinate system representation of the DLI to a base station in the fast-feedback region channel quality indicator channel allocated for the mobile station.

6. The apparatus of claim 5, wherein the instructions are executable by the processor to:
transmit information regarding the absolute location to the base station.

7. The apparatus of claim 6, wherein the information regarding the absolute location is transmitted in a response to a request for the absolute location by the base station.

8. An apparatus for wireless communications, comprising:
- means for receiving from a base station, in an allocation for a fast-feedback region channel quality indicator channel, a differential location information (DLI) profile identifier specifying transmission of a Polar coordinate system representation of DLI;
- means for determining, based in part on the DLI profile identifier, the Polar coordinate system representation of DLI for the mobile station relative to an absolute location of the mobile station; and
- means for transmitting the Polar coordinate system representation of the DLI to a base station in the fast-feedback region channel quality indicator channel allocated for the mobile station.

9. The apparatus of claim 8, further comprising:
- means for transmitting information regarding the absolute location to the base station.

10. The apparatus of claim 9, wherein the information regarding the absolute location is transmitted in a response to a request for the absolute location by the base station.

11. A computer-program product for wireless communication, comprising a non-transitory computer readable medium having instructions stored thereon, the instructions being executable by one or more processors and the instructions comprising:
- instructions for receiving from a base station, in an allocation for a fast-feedback region channel quality indicator channel, a differential location information (DLI) profile identifier specifying transmission of a Polar coordinate system representation of DLI;
- instructions for determining, based in part on the DLI profile identifier, the Polar coordinate system representation of DLI for the mobile station relative to an absolute location of the mobile station; and
- instructions for transmitting the Polar coordinate system representation of the DLI to a base station in the fast-feedback region channel quality indicator channel allocated for the mobile station.

12. The computer-program product of claim 11, wherein the instructions further comprise:
- instructions for transmitting information regarding the absolute location to the base station.

13. The computer-program product of claim 12, wherein the information regarding the absolute location is transmitted in a response to a request for the absolute location by the base station.

14. A method for wireless communications, comprising:
- transmitting to a mobile station, in an allocation for a fast-feedback region channel quality indicator channel, a differential location information (DLI) profile identifier specifying transmission of a Polar coordinate system representation of DLI;
- receiving the Polar coordinate system representation of DLI from the mobile station in the fast-feedback region channel quality indicator channel allocated to the mobile station, the Polar coordinate system representation of DLI indicating a location of the mobile station relative to an absolute location; and
- adjusting parameters of the mobile station based, at least in part, on the Polar coordinate system representation of DLI.

15. The method of claim 14, further comprising:
- allocating the fast-feedback region channel quality indicator channel for the mobile station.

16. The method of claim 14, further comprising:
- receiving information regarding the absolute location from the mobile station.

17. The method of claim 16, wherein the absolute location information is received in response to a request by a base station for the absolute location.

18. The method of claim 14, wherein a portion of the Polar coordinate system representation of DLI comprises a plurality of bits indicating one of a plurality of different angles, and another portion of the Polar coordinate system representation of DLI comprises another plurality of bits indicating a number of units of distance.

19. An apparatus for wireless communications, comprising:
- a processor;
- memory in electronic communication with the processor; and
- instructions stored in the memory and executable by the processor to:
- transmit to a mobile station, in an allocation for a fast-feedback region channel quality indicator channel, a differential location information (DLI) profile identifier specifying transmission of a Polar coordinate system representation of DLI;
- receive the Polar coordinate system representation of DLI from the mobile station in the fast-feedback region channel quality indicator channel allocated to the mobile station, the Polar coordinate system representation of DLI indicating a location of the mobile station relative to an absolute location; and
- adjust parameters of the mobile station based, at least in part, on the Polar coordinate system representation of DLI.

20. The apparatus of claim 19, wherein the instructions are executable by the processor to:
- allocate the fast-feedback region channel quality indicator channel for the mobile station.

21. The apparatus of claim 19, wherein the instructions are executable by the processor to:
- receive information regarding the absolute location from the mobile station.

22. The apparatus of claim 21, wherein the absolute location information is received in response to a request by a base station for the absolute location.

23. An apparatus for wireless communications, comprising:
- means for transmitting to a mobile station, in an allocation for a fast-feedback region channel quality indicator channel, a differential location information (DLI) profile identifier specifying transmission of a Polar coordinate system representation of DLI;
- means for receiving the Polar coordinate system representation of DLI from the mobile station in the fast-feedback region channel quality indicator channel allocated to the mobile station, the Polar coordinate system representation of DLI indicating a location of the mobile station relative to an absolute location; and
- means for adjusting parameters of the mobile station based, at least in part, on the Polar coordinate system representation of DLI.

24. The apparatus of claim 23, further comprising:
- means for allocating the fast-feedback region channel quality indicator channel for the mobile station.

25. The apparatus of claim 23, further comprising:
- means for receiving information regarding the absolute location from the mobile station.

26. The apparatus of claim 25, wherein the absolute location information is received in response to a request by a base station for the absolute location.

27. A computer-program product for wireless communication, comprising a non-transitory computer readable medium having instructions stored thereon, the instructions being executable by one or more processors and the instructions comprising:
- instructions for transmitting to a mobile station, in an allocation for a fast-feedback region channel quality indicator channel, a differential location information (DLI) profile identifier specifying transmission of a Polar coordinate system representation of DLI;
- instructions for receiving the Polar coordinate system representation of DLI from the mobile station in the fast-feedback region channel quality indicator channel allocated to the mobile station, the Polar coordinate system representation of DLI indicating a location of the mobile station relative to an absolute location; and
- instructions for adjusting parameters of the mobile station based, at least in part, on the Polar coordinate system representation of DLI.

28. The computer-program product of claim 27, further comprising:
- instructions for allocating the fast-feedback region channel quality indicator channel for the mobile station.

29. The computer-program product of claim 27, further comprising:
- instructions for receiving information regarding the absolute location from the mobile station.

30. The computer-program product of claim 29, wherein the absolute location information is received in response to a request by a base station for the absolute location.

* * * * *